FRIEDRICH BEUCHLE
INVENTOR

FRIEDRICH BEUCHLE
INVENTOR.

BY
Ross & Mestern

FRIEDRICH BEUCHLE
INVENTOR.

United States Patent Office 3,295,640
Patented Jan. 3, 1967

3,295,640
DISK-TYPE FRICTION BRAKE
Friedrich Beuchle, Frankfurt am Main, Germany, assignor to Alfred Teves Maschinen- und Armaturenfabrik K.G., Frankfurt am Main, Germany, a corporation of Germany
Filed June 15, 1965, Ser. No. 463,998
Claims priority, application Germany, Nov. 17, 1964,
T 27,435
4 Claims. (Cl. 188—218)

My present invention relates to disk-type friction brakes for automotive vehicles and like systems in which the braking device is required to terminate relative motion between a high-momentum load and a support.

The problems involved in braking high-momentum loads are manifold and include the difficulty of dissipating the considerable heat generated upon frictional interengagement of the relatively displaceable braking surfaces. In heavy industrial automotive vehicles, for example, and particularly in so-called "chain-driven" vehicles, considerable difficulty has arisen heretofore in the cooling of brakes and the prevention of their distortion in use. Such vehicles are characterized by a high kinetic energy and momentum and the frictional interengagement between the relatively displaceable braking surfaces frequently must be prolonged and of great pressure to bring the vehicle to a standstill or to slow it so that large amounts of friction heat are generated. This problem is even more acute when conventional disk brakes are to be used in the automotive vehicle inasmuch as the frictional surfaces of the segmental brake shoes engage the disk only over limited portions of its braking faces. The conventional disk-type brakes thus have brake shoes extending over segments of a circle and normally spaced from the brake disk while hydraulic, pneumatic or manual means is provided to shift the brake shoes perpendicularly to the disk to engage the brake. While there has been many proposals to prevent transfer of the thermal energy produced by braking from these segmental brake shoes to the actuating means therefor and to provide a circulation of cooling air to the shoes to limit their distortion, neither of these techniques has proved satisfactory for heavy-load automotive vehicles such as chain-driven trucks.

It is, therefore, an important object of the present invention to provide a brake system for movable elements having high momentum and energy and capable of obviating the disadvantages hitherto arising from the generation of excessive braking heat.

A further object of this invention is to provide an improved brake disk for co-operation with the brake shoes of a disk-type brake in which thermal difficulties can be eliminated.

These and other objects which will become apparent hereinafter are attained, in accordance with the present invention, through the provision of a brake system incorporating a brake disk whose braking faces on opposite sides of the disk are each formed with a multiplicity of angularly spaced cooling channels, the cooling channels on one side being angularly offset from the cooling channels on the other; according to an important feature of the present invention, the lands between the channels on each side are provided with brake linings forming the frictional-engagement surfaces of the disk, each of the brake linings and respective lands being thus underlaid by a cooling channel of other braking face.

The cooling channels according to my invention thus can extend along respective secants or chords of the disk circle, these lines being preferably tangential to a smaller circle centered upon the axis of the disk. Moreover, the cooling channels preferably widen outwardly so that their inner or inlet openings are relatively constricted with respect to their outer or outlet openings. When the disk rotates, therefore, a flow of cooling air is induced from the inlets through the cooling channels and the outlets to cool the adjacent lands and the brake linings carried thereby as well as the land and brake lining of the opposite face overlying each channel. The latter are flattened so as to underlie at least a major portion of the respective land on the other face of the disk and, according to the invention, this land extends only limitedly beyond the underlying channel. The lands may, pursuant to another feature of this invention, increase in thickness outwardly in the region in which they are provided with the brake linings. Moreover, a pair of annular grooves or recesses are disposed along each inner periphery of the braking faces and communicate with the inlets of the cooling channels in the form of respective manifolds.

According to still another feature of the present invention, the brake disk comprises a support member affixed to the axle of a wheel or a like rotatable member while the brake faces are provided upon a ring member keyed to the support member with at least limited freedom of axial movement. The support member can thus be an externally toothed gear wheel or splined cylinder while the ring member is internally toothed in the manner of a ring gear and is axially shiftable upon the support member. The brake shoes, according to the present invention, can then be mounted in a yoke fixed to the axle housing and disposed along at least a portion of the periphery of the disk and provided with actuating means for shifting one or more brake shoes against one braking face of the disk in a direction parallel to the axis thereof. Upon engagement by the brake shoes of the disk, the latter is shifted axially into engagement with one or more further brake shoes juxtaposed with its other braking face. In this manner the brake disk is sandwiched between a pair of brake shoes which engage the brake linings described above.

The above and other objects, features and advantages of the present invention will become more readily apparent from the following description, reference being made to the accompanying drawing in which.

Figure 1:
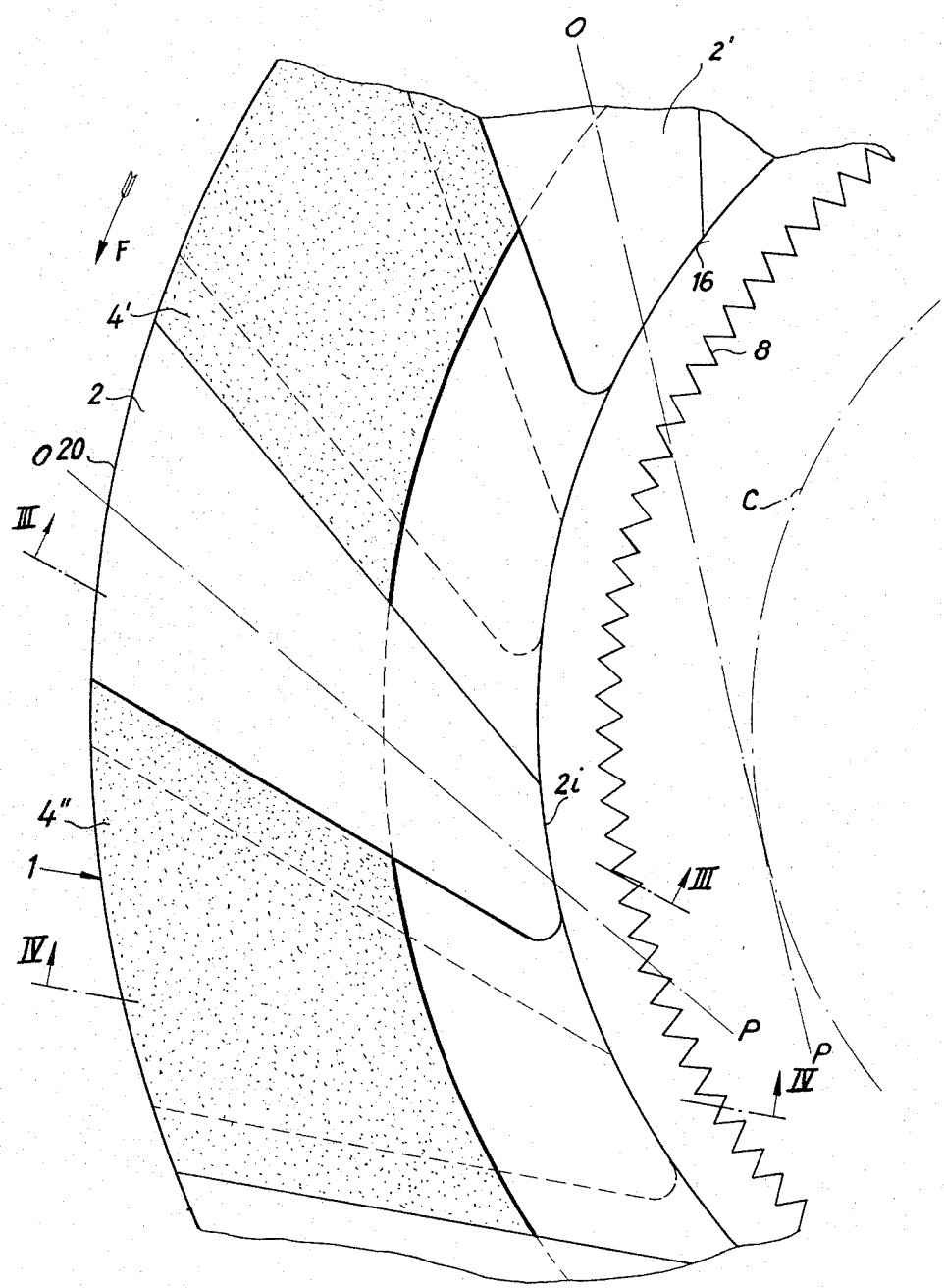
FIG. 1 is an elevational view of a segment of a brake disk embodying the present invention.
Figure 5:
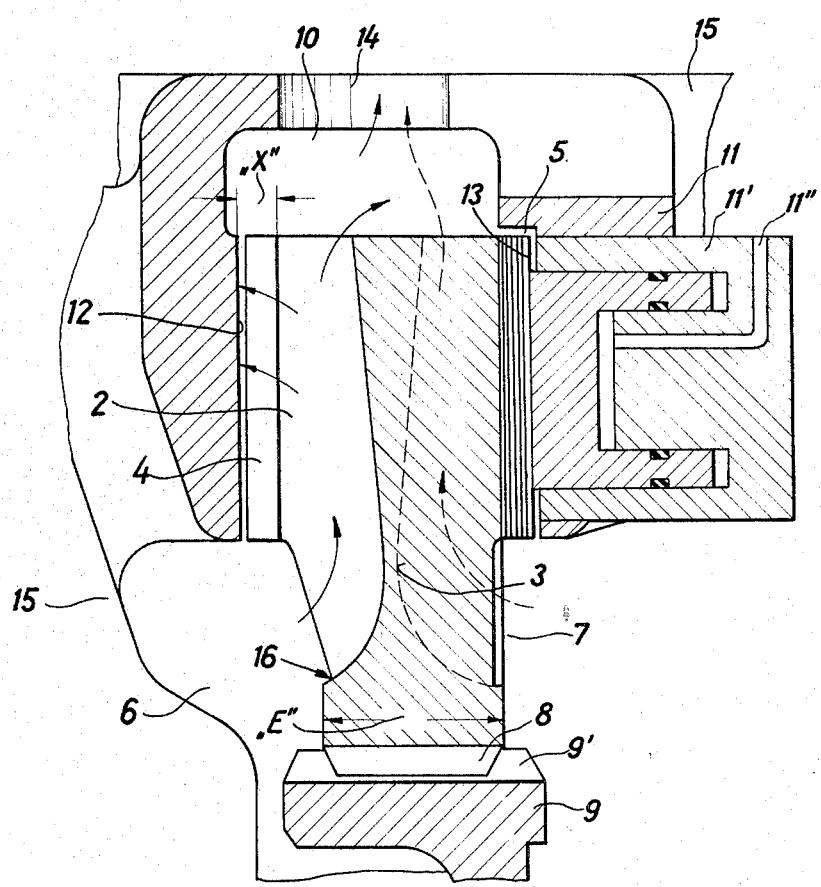
FIG. 5 is an axial cross-sectional view through a portion of the brake assembly showing the essential elements thereof.

Referring first to FIG. 5, in which a portion of the brake system is shown, it will be seen that the brake disk, according to the invention, comprises a disk-shaped support 9 which can be mounted upon the wheel axle of a motor vehicle and is peripherally toothed at 9' in the manner of a pinion gear for receiving the meshing teeth 8 of ring member 1 of the brake disk. The latter, as seen in FIG. 1, is constituted as an internal or ring gear whose teeth co-operate with the teeth 9' in the manner of a splined shaft and render the ring member 1 axially shiftable upon the support 9. A brake housing 11 forms a yoke around the periphery of the ring member 1 and carries, for example, a hydraulic cylinder 11' to which fluid can be introduced at 11" to shift it to the left (FIG. 5) and bring it into engagement with the brake linings carried by the right-hand face of the disk 1, 9 and thereby shift the ring member 1 to the left into engagement with the braking face 12 of the other side of the yoke. The braking face 13 of the cylinder 11' and braking surface 12 can also be provided with brake shoes although, for the purposes of the present invention, they are best constituted simply as metal surfaces engageable with the brake shoes of the disk. Suitable actuating means for the surfaces 12 and 13 are shown in commonly assigned copending application Ser. No. 437,434 filed March 5, 1965.

The disk 1 is provided upon its left-hand and right-hand faces with cooling channels 2, 2' . . . and 3, 3' . . ., respectively, between the lands of which are provided respective brake linings 4, 4' . . . and 5, 5' . . . . According to an important feature of our invention, the generally sectoral brake linings 4, 4', etc., and 5, 5', etc., completely fill the lands between the respective cooling channels 2, 2', etc., and 3, 3', etc., which diverge from their inlets along inner peripheral zones of the braking faces toward widened outlets along the outer periphery of the disk 1. The angularly spaced cooling channels 2, 2', etc., are offset from the similarly spaced cooling channels 3, 3', etc., on the other face of the disk by a distance of substantially half the angular spacing between the channels (FIGS. 1 and 2) so that each channel 2, 2', etc., or 3, 3', etc., respectively underlies a land 5, 5', etc., and 4, 4', etc., of the opposite face.

Figure 3:
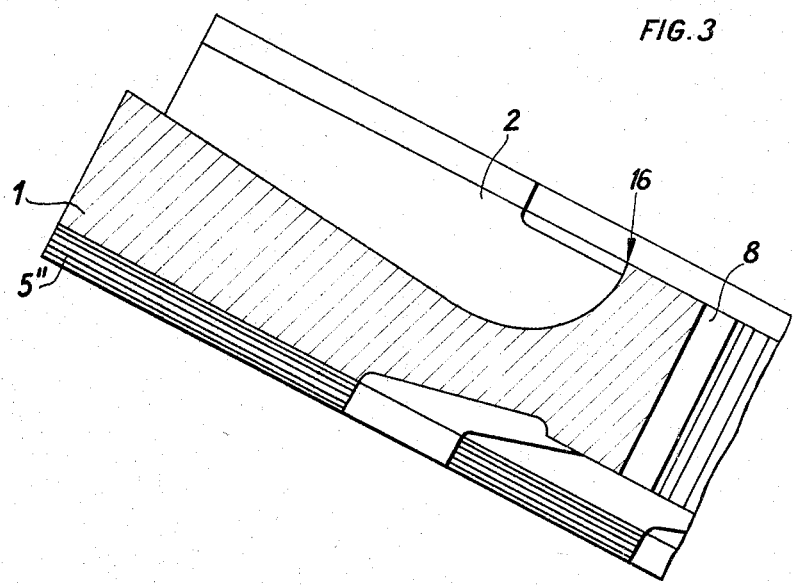
FIGS. 3 and 4 are cross-sectional views respectively taken along lines III—III and IV—IV of FIG. 1.
Figure 4:
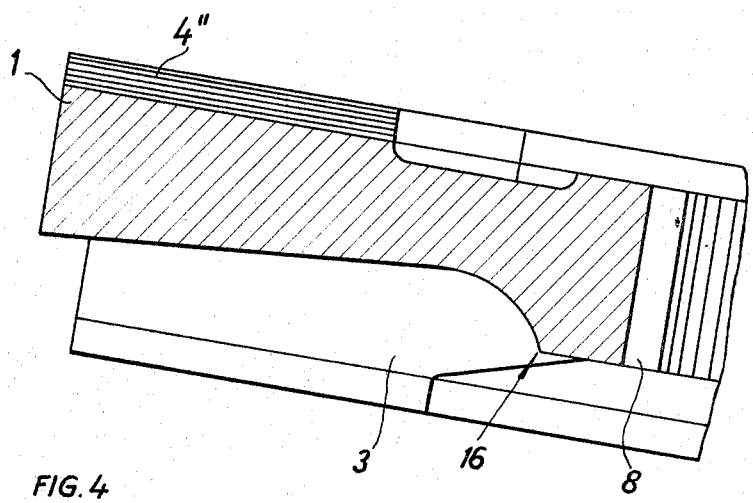

As can be seen in greater detail in FIGS. 3–5, the cooling channels 2, 2', etc., and 3, 3', etc., are of identical configuration and have their narrow inlets communicating with a respective annular recess 6 or 7 which serves as manifold supplying air from the region of the axis of the brake to the cooling channels from whence the coolant is discharged outwardly along the outer periphery of the disk. The brake housing 11 can then define with the periphery of the disk an annular outlet manifold or duct 10 into which the cooling air is forced upon rotation of the disk and from which the coolant is discharged via outlet slots 14 along the outer periphery of the housing 11. The latter is secured to the axle housing by any suitable connecting structure represented diagrammatically at 15. Since the channels 2, 2' and 3, 3', etc., respectively open axially into the direction of the juxtaposed surfaces 12 and 13 of the angularly fixed members of the braking system, these members are also subjected to the cooling action of the fluid drawn outwardly along the disk.

Figure 2:
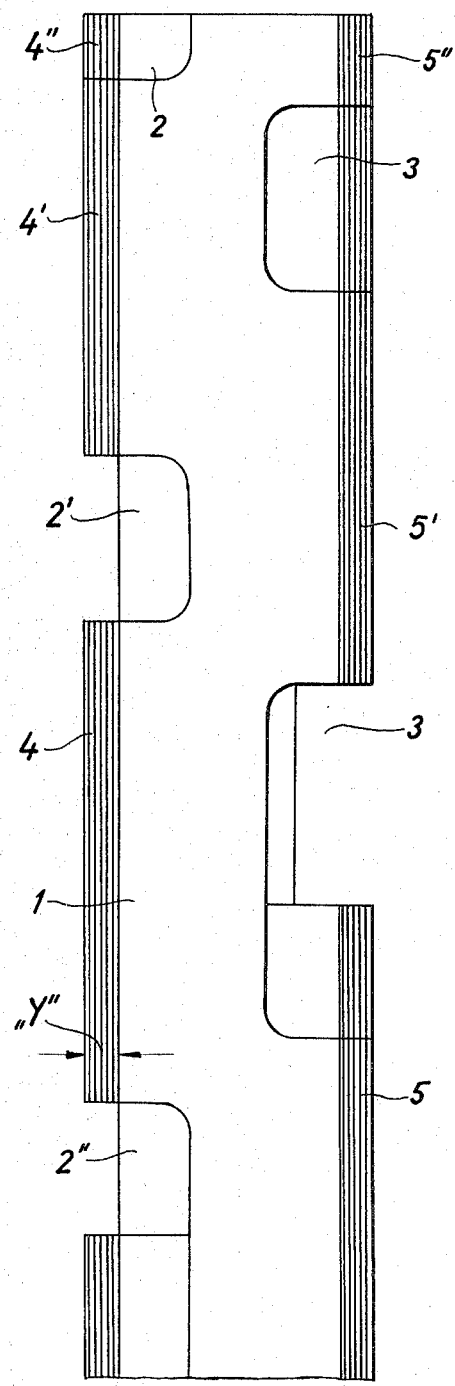
FIG. 2 is an end view of this disk.

As will be seen from FIG. 1, the cooling channels 2, 2', etc., and 3, 3', etc., are inclined toward one another in the direction of rotation of the disk and lie along respective secants O–P when the disk rotates in the direction of arrows F (counterclockwise in FIG. 1). The secants O–P are tangential to an imaginary circle C whose diameter is less than that of the ring member 1 of the brake disk. The brake linings 4, 4', etc., and 5, 5', etc., completely fill the lands between the respective cooling channels along the outer periphery of the disk while the channels extend in width over a substantial portion of the angular exent of the brake shoe underlaid thereby. It has been found that best results are obtained when the inlets of the cooling channels (e.g., as designated at 2i) have approximately half the width (in terms of arc length or angular extent) of the outlets 20. As indicated in FIG. 2, the depth of the channels can range from substantially one-third to one-half the thickness of the disk at the inlets between the faces to which the brake linings are affixed while the thickness at the outlets can be only a fraction of the thickness at the inlets. The depth of the channels thus progressively decreases (in axial direction) outwardly. This arrangement imparts a generally funnel-shaped configuration to the cooling channels and permits the disk to have a minimum thickness with maximum cooling efficiency.

In operation, as previously noted, the rapid displacement of the disk in the direction of arrow F induces a flow of air from the annular recesses 6, 7 through the cooling channels 2, 2', etc., and 4, 4', etc., ejecting it into the outlet duct 10 from whence it flows radially through the slots 14. When the brakes are applied, the braking faces 13 are brought into engagement with the brake linings 5, 5', etc., while the disk 1 is urged axially to the left (arrow E) until the brake linings 4 engage the surfaces 12 of the stationary brake members 11. The disk 1 is shiftable upon the support 9 although axially entrained thereby through an axial distance $x$ equal at least to the sum of the brake-play distance and the thickness of the brake shoes 4, 5. Upon release of the brake, the actuated elements can be restored to their original positions in the usual manner. It will be evident that a high-rate cooling of both the stationary brake members and the brake disk carrying the brake linings is effected without the use of impellers or the like in addition to the brake disk for circulating a cooling fluid therealong.

My invention admits of various modifications apparent to persons skilled in the art without departing from the spirit of the appended claims and thus included within the scope thereof.

I claim:

1. A brake disk for a disk-type brake having a pair of brake members disposed on opposite sides of said disk and engageable therewith for braking rotation of said disk relative to said members, said disk comprising a rotatable central support and an annular engagement portion surrounding said support and having opposite faces juxtaposed with said members, said faces each being formed with a multiplicity of angularly spaced outwardly divergent cooling channels open in the direction of the respective member and inducing a flow of cooling fluid therethrough upon rotation of said disk, said channels lying along respective tangents to an imaginary circle centered on the axis of rotation of said disk and of a diameter less than that of said engagement portion of said disk, the cooling channels of one of said faces being angularly offset from the cooling channels of the other of said faces, the channels in each of said faces defining between them angularly spaced lands frictionally engageable by said members and cooled by said fluid upon the passage thereof through the adjoining channels and a respective channel of the opposite face disposed between the adjoining channels, said disk being further provided with a pair of annular grooves disposed along the respective sides thereof at the inner periphery of said engagement portion of said disk, said channels being of progressively axially decreasing depth outwardly along the disk, said channels communicating with the respective grooves for drawing said fluid therefrom and ejecting said fluid generally outwardly.

2. A brake disk as defined in claim 1 wherein each of said lands is formed with a respective brake lining of a material having a high coefficient of friction and said linings completely overlie said lands between the adjoining channels.

3. A brake disk as defined in claim 1 wherein said engagement portion is axially shiftable on said central support but is keyed thereto for rotatable entrainment by said support.

4. A brake disk as defined in claim 3 wherein said support is provided with a toothed outer periphery and said engagement portion is provided with a complementary toothed inner periphery engaging said outer periphery.

References Cited by the Examiner
UNITED STATES PATENTS

| | | | |
|---|---|---|---|
| 1,572,870 | 2/1926 | Armstrong. | |
| 2,218,614 | 10/1940 | McCune | 188—264 X |
| 2,690,248 | 9/1954 | McDowall. | |
| 3,002,595 | 10/1961 | Weir | 188—264 X |
| 3,171,527 | 3/1965 | Ott | 188—264 X |
| 3,184,023 | 5/1965 | Hovde | 192—113 X |
| 3,231,058 | 1/1966 | Batchelor et al. | 188—218 X |

FERGUS S. MIDDLETON, *Primary Examiner.*

MILTON BUCHLER, *Examiner.*

G. E. A. HALVOSA, *Assistant Examiner.*